Aug. 12, 1969  T. M. ROBERTS ET AL  3,460,235
WELDING OF TRANSITION PIECES

Filed April 16, 1964  2 Sheets-Sheet 1

Inventor
Thomas M. Roberts
Peter J. Housecroft
By Simon Peterson
Stewart & Estabrook
Attorneys

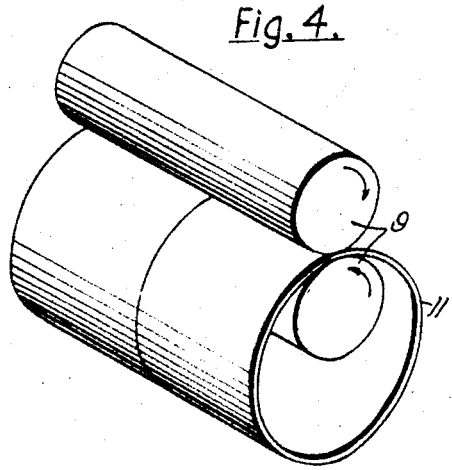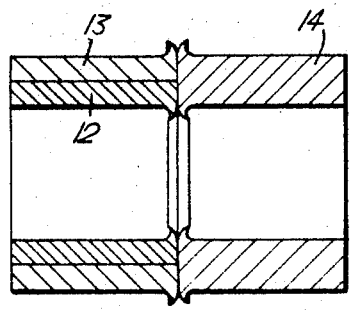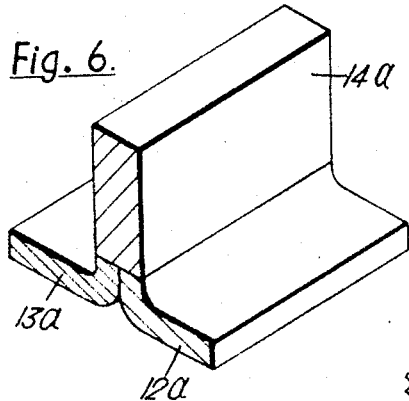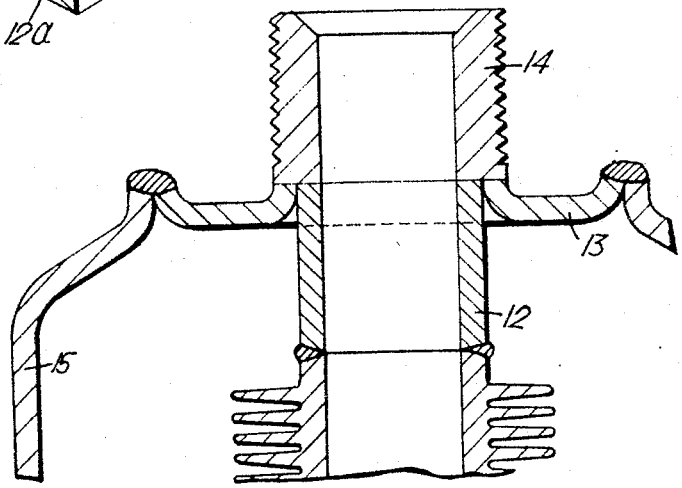

3,460,235
WELDING OF TRANSITION PIECES
Thomas Marmaduke Roberts and Peter Thomas Houldcroft, Abington Hall, Cambridge, England, assignors to The Welding Institute, London, England, a body corporate of Great Britain
Filed Apr. 16, 1964, Ser. No. 360,292
Claims priority, application Great Britain, Apr. 22, 1963, 15,782/63
Int. Cl. B21h 1/00; B23k 11/02
U.S. Cl. 29—470.3      4 Claims As engineering plant is pushed to the limit of endurance it often becomes necessary to make the components of several different materials, each being the optimum choice in its own part of the whole. This inexorable trend is giving rise to an increasing number of dissimilar metal joining problems. One method of reducing the difficulty in making dissimilar metal joints is to use a transition piece. This solution has been widely used in chemical and power plant for the joining of ferritic to austenitic steel tubes and pipes. Here the transition piece is a short length of pipe containing a joint between the ferritic steel and the austenitic steel, which is made, for example, by a forging technique. This piece is then welded into the system using conventional welding techniques.

However, the shape and thickness of transition pieces made by existing techniques has been somewhat restricted. For example using such techniques it would not have been possible to join a thin sheet of aluminum to a thin sheet of copper without producing either a lap joint or a butt joint having a thickened seam of undesirable characteristics.

According to the present invention, these difficulties are overcome by forming a transition piece by welding a tube of a first metal to a tube of a second metal by friction welding; the friction welded joint has such properties that it can then be worked to form a transition piece of the required shape or thickness. The working of the friction welded transition piece may for example take the form of rolling, spinning or forging. If a flat transition piece is required the cylinder resulting from joining the two pipes is split longitudinally before being rolled flat and, if necessary, reduced in thickness. A number of individual transition pieces can be cut from a single transition sheet prepared in this manner. If a thin cylindrical transition piece is required, the rolling of the friction-welded cylinder may be carried out in the manner in which locomotive tyres have sometimes been rolled in cylindrical form. The transition piece is then welded into the assembly using conventional welding techniques which do not require the generation of frictional heat.

The ability of this technique to produce thin transition pieces having good mechanical properties is due to the fact that friction welding gives a joint which is more amenable to rolling out or otherwise working to reduced thickness owing to the fact that there is only a small amount of brittle intermetallic compound. As examples of transition pieces which may be made by this technique, copper can be joined to aluminium or aluminium to stainless steel and, if desired, three-part transition pieces can be manufactured, for use where the two parts to be joined by the transition piece are of materials which cannot be welded together satisfactorily but which can each be welded to the material of the common centre portion of the transition piece.

In order that the invention may be better understood some examples of methods of manufacturing transition pieces will now be described with reference to the accompanying drawings in which:

FIGURE 4 illustrates the formation of a thin cylindrical transition piece;

FIGURE 5 shows a friction welded tubular member of three different materials; and FIGURES 6 and 7 illustrate different forms of transition pieces which can be made from the tubular member of FIGURE 5.

Figure 1:
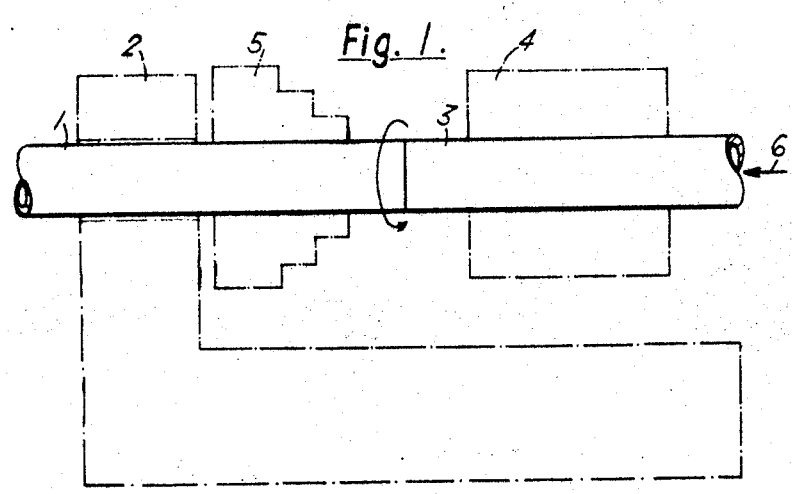
FIGURE 1 illustrates diagrammatically the apparatus required for the friction welding operation.

In FIGURE 1 a tube 1 made of one of the materials to form the transition piece is supported in bearing in a stand 2 with one of its ends held under pressure against one end of a tube 3 of a second material to be used in the transition piece, the tube 3 being fixed against rotation in a support 4. By means of the chuck holder 5 the tube 1 is caused to revolve and as a consequence heat is developed at the interface between the tubes 1 and 3 and causes the metal to flow, forming an extruded fin or collar around the joint. When enough heat has been generated to make the material plastic and sufficient flow has occurred to break down the surface oxide films on the ends of the tubes the rotation is stopped and a forging pressure is applied in the direction of the arrow 6 to consolidate the joint.

Although heat is generated at the joint the temperatures achieved do not cause fusion and the thermal gradients are less extreme than in many other forms of welding. The exclusion of air from the joint together with the absence of fusion (which is at the most superficial) enable a strong joint to be produced between dissimilar metals. As stated above, the friction welded joint can be shaped or worked to reduce its thickness without destroying its mechanical properties.

Figure 2:
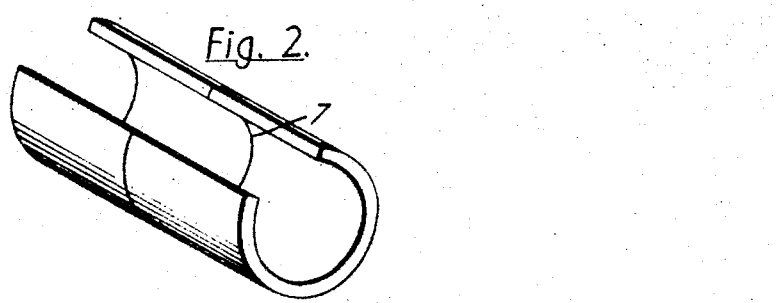
FIGURES 2 and 3 illustrate steps in the formation of flat transition pieces.
Figure 3:
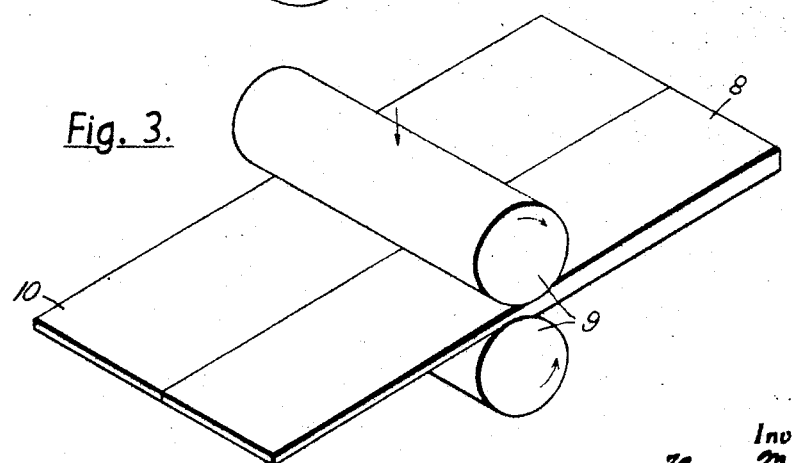

The formation of a flat transition piece from the friction welded tube is illustrated in FIGURES 2 and 3. In FIGURE 2, the tube has been split longitudinally at one point in its periphery, the line 7 representing the friction weld between the end portions of different metals. As shown in FIGURE 3 after splitting the cylindrical tube is rolled flat to form a sheet 8 which is then passed between rollers 9 to reduce its thickness. Thin flat transition pieces can then by cut from the end 10 of the rolled sheet.

FIGURE 4 illustrates the rolling of the friction welded tubes to produce a thin-walled cylindrical transition piece 11.

In the example shown in FIGURE 5 a tube 12 is placed coaxially within a tube 13 and the ends of these tubes are then friction welded to a single tube 14 having a wall thickness equal to the combined thickness of the tubes 12 and 13. The resulting friction welded tube can then be treated in the manner illustrated in FIGURES 2 and 3 to form a thin flat transition piece which has on one side of the friction weld a sheet of a first metal and on the other side of the friction weld two superimposed sheets of metals different from the first metal. As shown in FIGURE 6, the two superimposed sheets 12a and 13a can be separated to form a T-shaped transition piece, the stem of the T being formed by the single sheet 14a on the other side of the friction weld.

As an alternative, the friction welded tube shown in FIGURE 5 may be treated in the manner illustrated in FIGURE 7, that is to say the portions 14 and 12 may remain in tubular form while the portion 13 is forced away from the tube 12 and then subjected to a spinning operation until it forms a flat disc surrounding the tube 12. Such a construction might be used when a pipe of one metal has to be introduced into a vessel of another metal. In the example shown in FIGURE 7, a threaded stainless steel outlet 14 for the tube 12 is welded onto an aluminium vessel 15 by means of a transition piece formed by the outlet 14 and flange 13.

As an example of the speed of rotation and forces necessary to produce a friction weld with the apparatus shown in FIGURE 1 if a tube of aluminium is to be friction welded to a tube of stainless steel and the tubes have a diameter of 2 inches and a wall thickness of ⅜ inch, the speed of the rotating tube should be between 500 and 750 revolutions per minute and the friction force applied during rotation should be 2 tons. The forging or upset force applied when rotation is stopped should be 8 tons. Further details of the friction welding process can be obtained from "The Friction Welding of Metals" by V. I. Vill published by the American Welding Society.

We claim:

1. A method of forming a triple-end metallic transition piece, including the steps of simultaneously joining the end of a tube of one metal to the ends of two coaxial tubes of a different metal or metals, arranged one inside the other, by friction welding; and spinning the outer of the two coaxial tubes after the friction welding step to form a flange perpendicular to the axis of the tubes.

2. A method of forming a triple-end metallic transition piece, including the steps of simultaneously joining the end of a tube of one metal to the ends of two coaxial tubes of different metal or metals, arranged one inside the other, by friction welding; splitting the resultant friction welded tube longitudinally; flattening the spilt tube to form a transition piece in which two superimposed sheets are present on one side of the weld; and separating the two superimposed sheets at the end remote from the weld.

3. A method of forming a metallic transition piece of a given shape and thickness and comprising at least two metals, including the steps of butt welding a tube of one metal to a tube of another metal by friction welding and thereafter working the resultant friction welded member to modify its shape by splitting the friction welded tube longitudinally, flattening, and then rolling to reduce its thickness.

4. A method of forming a metallic transition piece of a given shape and thickness and comprising at least two metals, including the steps of butt welding a tube of one metal to a tube of another metal by friction welding and thereafter working by rolling the friction welded tube to reduce its thickness and to form a thin-walled cylindrical transition piece.

References Cited

UNITED STATES PATENTS

| | | | |
|---|---|---|---|
| 937,314 | 10/1909 | Luduigsen | 29—480 |
| 1,662,506 | 3/1928 | Mansfield | 29—480 |
| 1,776,855 | 9/1930 | Holmes | 29—480 |
| 2,396,704 | 3/1946 | Kerr | 29—504 |
| 2,763,923 | 9/1956 | Webb | 29—504 |
| 3,175,284 | 3/1965 | Catousky | 29—481 X |
| 2,438,405 | 3/1948 | Kinnear | 29—194 |
| 3,134,169 | 5/1964 | Kollander et al. | 29—497.5 |
| 3,201,853 | 8/1965 | Howarth et al. | 29—475 |
| 3,225,437 | 12/1965 | Stohr et al. | 29—473.5 |
| 3,234,643 | 2/1966 | Hollander | 29—470.3 |
| 3,234,646 | 2/1966 | Hollander et al. | 29—470.3 |

CHARLIE T. MOON, Primary Examiner

R. B. LAZARUS, Assistant Examiner

U.S. Cl. X.R.

29—194, 196, 473, 475, 476, 480; 72—367, 370